Sept. 22, 1925.

G. H. STALLMAN 1,554,382

SAUSAGE LINKING MACHINE

Filed Nov. 28, 1923   5 Sheets-Sheet 1

Fig.1

Inventor
Granville H. Stallman
By [signature] Atty

Sept. 22, 1925.

G. H. STALLMAN 1,554,382

SAUSAGE LINKING MACHINE

Filed Nov. 28, 1923     5 Sheets-Sheet 3

Inventor
Granville H. Stallman

Patented Sept. 22, 1925.

1,554,382

UNITED STATES PATENT OFFICE.

GRANVILLE H. STALLMAN, OF CHICAGO, ILLINOIS.

SAUSAGE-LINKING MACHINE.

Application filed November 28, 1923. Serial No. 677,372.

*To all whom it may concern:*

Be it known that I, GRANVILLE H. STALLMAN, a citizen of the United States, residing at Chicago, in the county of Cook and State of Illinois, have invented certain new and useful Improvements in Sausage-Linking Machines, of which the following is a specification.

This invention relates to improvements in sausage linking machines and one of the objects of the invention is to provide an improved machine of this character having means for dividing the casings into predetermined lengths to form links and also provided with improved means for twisting predetermined links so as to twist the connecting portion of the casing between adjacent links for causing the links to maintain their shape.

A further object is to provide improved means for delivering or distributing the chain of links across a stick or support and over which stick the links are hung when the stick is removed so that the links may be readily transported and subjected to further treatment.

A further object is to provide an improved machine of this character which will be of a comparatively simple construction, durable, effective, efficient and automatic in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which—

Referring more particularly to the drawings the numeral 15 designates generally a supporting structure which may be of any desired size and configuration and constructed of any suitable material, and journaled in suitable bearings to extend across the supporting frame or structure is a main drive shaft 16 for imparting motion to the various parts.

This shaft 16 receives its motion from any suitable source but preferably through the medium of a pulley 17 connected with the shaft and preferably arranged outside of the supporting structure.

Journaled also in suitable bearings upon the framework parallel with but spaced from the shaft 16 is another shaft 18 and connected respectively with the shafts 16—18 and in alinement with each other are toothed wheels 19—20 of any desired diameter. Teeth 21 of each of these wheels are preferably provided with recesses 22 opening through the periphery of the teeth for a purpose to be hereinafter set forth.

Arranged above the shaft 16 and parallel thereto so as to extend across the frame or support is a shaft 23 and a shaft 24 is also journaled in suitable bearings above and parallel with the shaft 18.

Toothed wheels 25—26 are respectively connected with the shafts 23—24 and these wheels 25—26 are of a construction similar to the wheels 19 and 20.

The shafts 23—24 are respectively spaced above the shafts 16 and 18 a sufficient distance so that the shaping and twisting mechanism, to be hereinafter described, will pass between the peripheries of the adjacent wheels.

The shaping and twisting mechanism consists of two endless flexible members each of which members is in turn formed by a plurality of alternately arranged shaping and twisting elements pivotally connected together. One of the endless elements passes around the wheels 25—26 while the other endless element passes around the wheels 19—20. The endless elements are so arranged with respect to each other that the respective elements of the adjacent runs of the endless members will, during predetermined portions of their traveling movement, co-operate to act upon the casing to be shaped, in a manner as will be hereinafter described.

Figures 9, 10, 11, 12, 13:
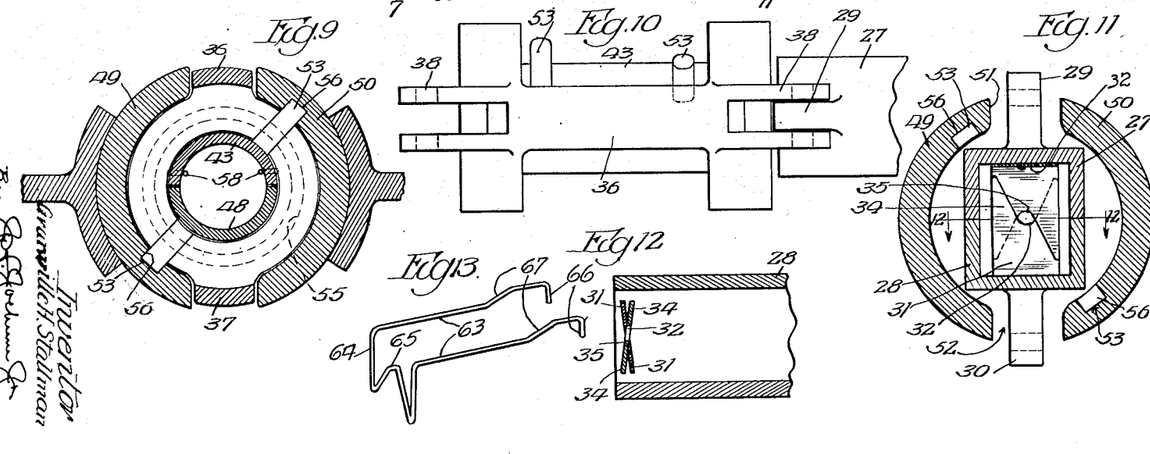
Figure 9 is a sectional view taken on line 9—9, Figure 8.
Figure 10 is a detail top plan view of one of the twister devices.
Figure 11 is a sectional view taken on line 11—11, Figure 8, with parts omitted.
Figure 12 is a detail sectional view taken on line 12—12, Figure 11.
Fig. 13 is a modified form of the advancing elements, shown in Fig. 8 and Fig. 11.

Each of the shaping members consists of two sections 27—28 provided respectively with lugs or ears 29—30 at the ends thereof and these members 27—28 may be of any desired configuration but are preferably angular in cross section, as shown more clearly in Figure 11, so that the angularity of the element will assist in a measure in holding the portion of the casing disposed therein, against rotation with respect to the element during the twisting operation.

Any suitable means may be provided for dividing the casing at predetermined points in the length thereof as such portions enter between the elements 27 and 28, and which latter elements constitute the holding device. A suitable and efficient means for dividing and holding the casing may be provided by shaping the ends of one of the elements, preferably the element 28, so as to form a portion 31 projecting beyond the bottom of the element 28 and in a direction transverse to the longitudinal axis of the element. This projection 31 is located adjacent the ends of the element 28 and preferably adjacent the pivots thereof. The projections 31 may be of any desired height and are notched as at 32, the bottom of the notch being disposed in close proximity to the diametric center of the elements 27—28, when assembled.

Carried by the other element 27 is a member 32 preferably of an elastic nature, one end of each of which elements 32 is secured as at 33 to the member 27. The free end of the element 32 is deflected as at 34 and the deflected portion 34 is so disposed that when the elements 27—28 are brought together the laterally deflected portion 34 of the elements 32 will be disposed in close proximity to the portion 31 of the element 28. The free end of the element 34 is notched as at 35 to correspond with the notch 32 in the portion 31. One of the portions 31—34, or both if desired, may be twisted axially so that the jaws of the bifurcations in the respective portions will be arranged in planes that when the members 27 and 28 are brought together one of the bifurcations will enter the other and thereby maintain the connecting portion of the casing which is to be twisted, in a straight line with the axis of the twister.

The elements 27—28 may be of any desired length according to the length of link which it is desired to produce.

The twister consists of two semi-circular members 36—37 respectively provided with lugs or projections 38—29 at the extremities thereof adapted to co-operate with the respective lugs 29—30 on the next adjacent sections 27—28, and pivot pins 40 are passed through the respective adjacent co-operating lugs to pivotally connect the sections or members 26—37 and 37—28. The projecting lugs formed at the pivots of these respective sections respectively enter the recesses in the teeth of the respective wheels 19, 20, 25 and 26, so that the endless members will be simultaneously advanced and the respective cooperating sections thereon will be brought together during predetermined portions of the advancing movements of the sections and will continue in close proximity to each other for a predetermined length of the travel, after which the sections will be separated so as to permit the links which have been formed during the previous movement of the endless members, to be delivered from between the members.

The members 36—37 are preferably semi-circular in cross section and as these sections are of a similar construction the specific description of one will apply equally as well to both.

Figures 7, 8:
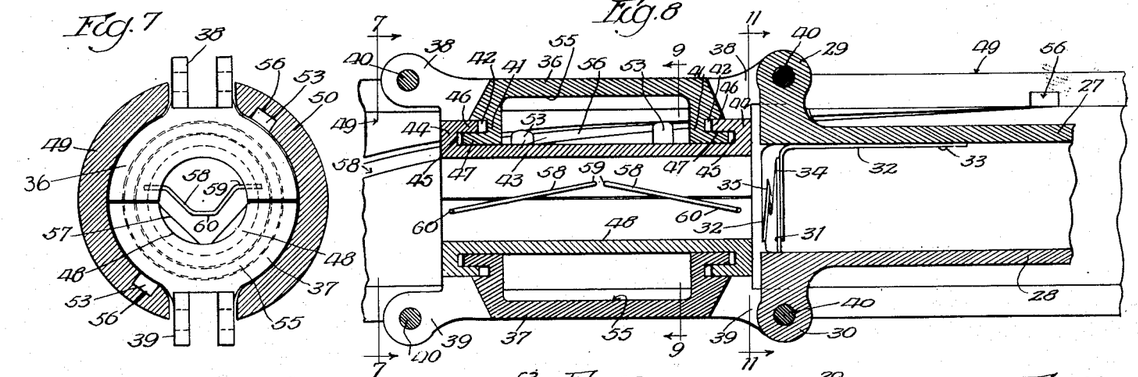
Figure 7 is a sectional view taken on line 7—7, Figure 8.
Figure 8 is an enlarged detail view partly in elevation and partly in section showing the shaping and twisting devices.

The section 36 is provided with end walls 41, having outwardly opening recesses 42 (see particularly Figure 8). A semi-circular member 43 provided with circumferential flanges 44 arranged at its ends, co-operates with the member 36. The flanges 44 are provided with recesses 45 opposed to the recesses 42 and arranged in different planes so that the walls 46 formed by the recesses 45 in the flanges 44 will enter the recesses 42 formed in the flanges 41 of the element 36 while the walls 47 formed by the recesses 42 on the element or member 36 will enter the recesses 45 in the flanges 44. These walls 46—47 together with the respective recesses 42 and 45 are respectively of a sufficient length and depth to hold the members or elements 36—43 against longitudinal displacement with respect to each other, but will permit of a slight relative longitudinal adjustment and will also permit of the member 43 rotating with respect to the member 36.

The member 43 is connected with the member 36 by twisting the member 43 about its axis, it being understood that the ends of the grooves or recesses 42 and 45 are open so as to permit connecting and disconnecting of the member 43 to and from the member 36.

The co-operating member 48 being of a construction similar to the construction of the member 43, it will be manifest that when the co-operating members 36 and 37 are brought together to form a complete housing the members 43 and 48 will also form a complete rotatable housing within the elements or members 36—37.

Any suitable means may be provided for rotating the members 43—48 with respect to the members 36—37 during the advancement or travel of these members. A suitable and efficient means will now be described.

Figure 5:
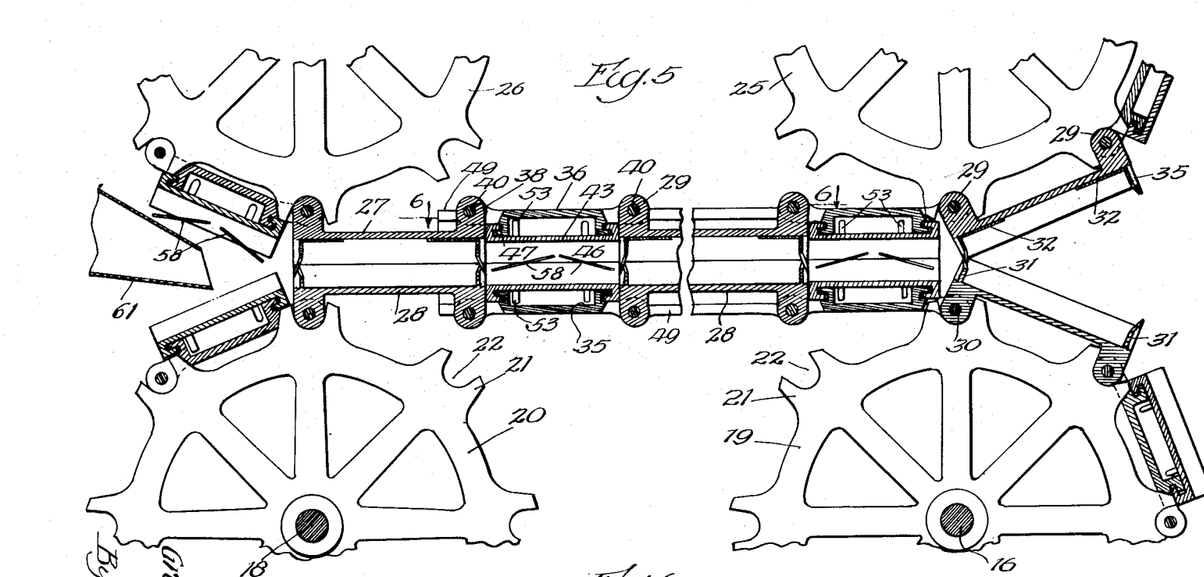
Figure 5 is an enlarged detail view partly in elevation and partly in section of the shaping and twisting mechanism.

The peripheries of the members 36—37 are circular as are also the peripheries of the members 27—28, and during the advancing movement of these members and at the time when the respective members are brought in close proximity or in the position shown more clearly in Figures 5 and 8, these co-operating members will pass in a slotted casing or housing preferably formed by means of guides 49—50 curved in directions transverse to the longitudinal axis of the members. The proximate ends of the members 49—50 terminate short of each other to form slots 51—52 (see particularly Figures 7 and 11), in which slots the lugs 29 and 30 forming the pivots between adjacent sections of members travel, while the body portions of these sections or members travel between the guides.

It will be manifest that as these co-operating members 27—28—36—37 travel between the guides 50 and inasmuch as the pivot lugs 29—30 project into or through the slots 51—52, the members will be held against rotation and in order therefore to rotate the elements or members 43—48 within the members 36—37 during such time of travel the members 43—48 are provided with pins or projections 53—54 extending beyond the peripheries of the respective members. The members 36 are preferably cut away as at 55 (see particularly Figure 10) so as to permit the pins or lugs 53—54 to engage and travel in grooves or guideways 56 arranged in the inner wall or adjacent faces of the guide members 49—50. The grooves or guideways 56 are arranged spirally of the length of the guides 49—50 and the grooves 56 and guides 49—50 are of such a length that by the time the members 36—37 have traversed the entire length of the guides 49—50, the cooperating members 43—48 will have made one complete revolution about their axes. Obviously this groove 56 and the guides 49—50 may be of any desired length to cause any number of revolutions desired.

As a means for insuring the rotation of the portion of the casing disposed between the members or elements 43—48, during the time that these members rotate, the walls of the member 48 may be arranged to incline inwardly and downwardly as at 57 (see particularly Figure 7) and holding members 58, preferably in the form of springs may also be provided. These members 58 are anchored at one end as at 59 and the free ends 60 of the members preferably terminate adjacent the ends of the element 43 and at points preferably below the diametric center of the casing or housing formed by the co-operating members 43—48, when the latter are brought together.

These elements 58—59 may be of any desired resiliency so as not to injure the casing and so that they will yield but are of sufficient strength to force the casing downwardly or between the inclined walls 57 of the element 48 so as to cause that portion of the casing to be irregular in cross section, so that it will rotate with the members 43—48.

The elements 27—36 and 28—37 are respectively pivoted together so as to form links in the respective endless members, and any adjustment of the toothed wheels over which these respective endless elements pass will not interfere with the proper operation of the twisting elements 43—48, owing to the manner heretofore described in which these elements 43—48 are respectively connected with the elements 36—37.

It is thought that the operation of this portion of the machine will be clearly understood from the foregoing but briefly stated it as follows, reference being had more particularly to Figures 5 and 8.

The filled casing is fed into the machine in any desired or suitable manner and enters between the twisting and shaping members at the point A and may be fed down a suitable incline or chute 61. The forward portion of the casing will then enter between the advancing elements 27—28 or 36—37, whichever elements happen to be at the point of entry. If the shaping elements are at that point a portion of the casing will be delivered between the shaping elements and as these elements 27—28 are brought together the bifurcations 32—35 in the portions 31—34 will receive a portion of the casing and as the members 27—28 are brought together the walls of the bifurcation will compress the casing and separate the material within the casing. The casing will be advanced by these co-operating elements 27—28 so as to permit the next succeeding twister elements 36—37 to receive the next adjacent portion of the cas- -ing. As the twister elements are brought together during the advancement the springs 58 will force the casing into the bottom of the element 48 and just at this time or at the time that the elements 36—37 carrying the respective twister elements 43—38 are in operative position with respect to each other, the pins or lugs 53 will enter the grooves 56 in the guides 49—50 so that as the members 36—37 advance the twister members 43—48 will be given a rotation about their axes and within the members 36—37. This will twist the portion of the casing between the proximate ends of the adjacent sections of the endless members, while the portion of the casing held between the members 27—28 will be held against rotation.

As the shaping and the twisting elements are alternately arranged it will be manifest that the alternating links formed of the casing will be twisted.

Figure 6:
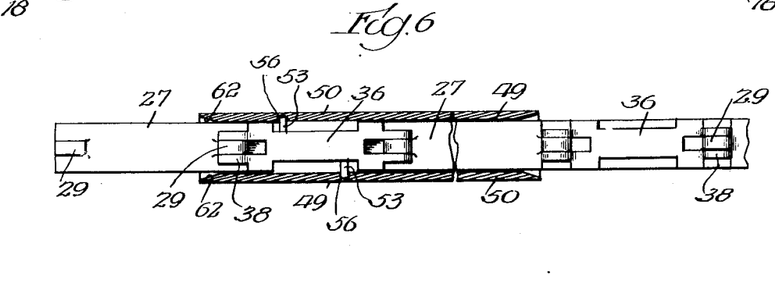
Figure 6 is a horizontal sectional view as taken on line 6—6, Figure 5, showing some of the parts in elevation.

In order to guide the members into the space between the guides 49—50, the ends of the guides may be beveled if desired, as shown at 62, and as shown more clearly in Figure 6.

If desired the element 32 may be constructed as shown in Figures 8 and 11 or may be formed of a single piece of wire like material 63, one end of which is bent to form a downwardly opening fork shaped member 64, the jaws of which are laterally offset as at 65, and in order to permit of a springing action of the member the ends 66 thereof by means of which the member is anchored may be offset as at 67 so as to hold the jaw member spaced from the wall of the element 27.

Figure 3:
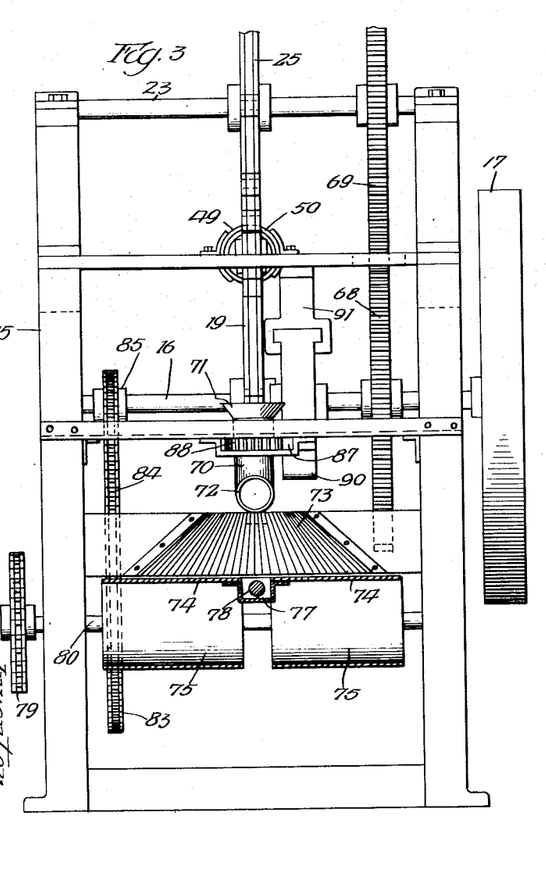
Figure 3 is a view taken from the right hand end of Figure 1, partly in elevation and partly in section and with parts omitted.
Figure 4:
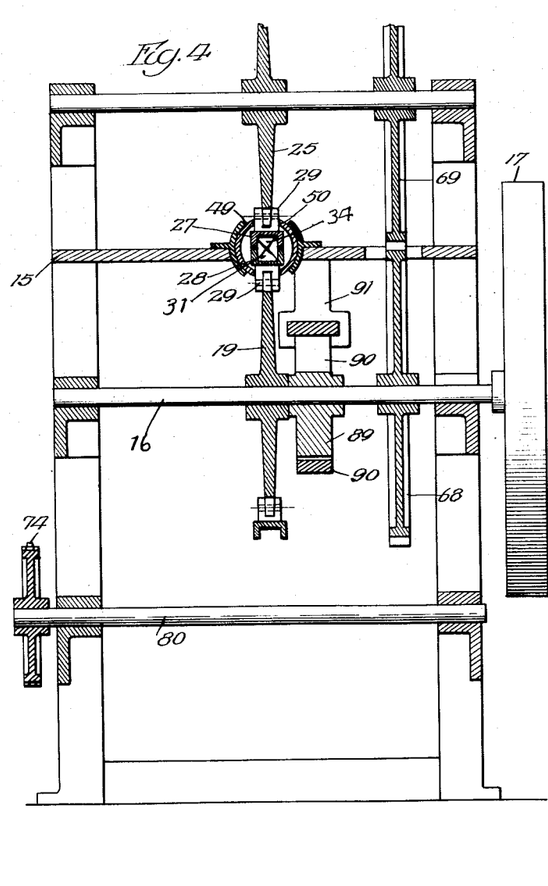
Figure 4 is a detail sectional view as taken on line 4—4, Figure 1.

Any suitable means may be provided for imparting motion to the twisting and shaping members. One of the endless elements embodying one section of these members receives its motion from the drive shaft 16 inasmuch as the wheel 19 is connected thereto for rotation therewith. Carried by the shaft 16 is a gear 68 (see particularly Figure 3) which meshes with a gear 69 carried by the shaft 23 and to which shaft 23 the toothed wheel 25 is connected. The toothed wheel 19 being connected with the shaft 16 it will be manifest that a rotation of the shaft 16 will cause both of the wheels 19—25 to rotate. The motion of these wheels 19—25 is respectively transmitted to the wheels 20—26 through the medium of the respective endless flexible members.

Figure 1:
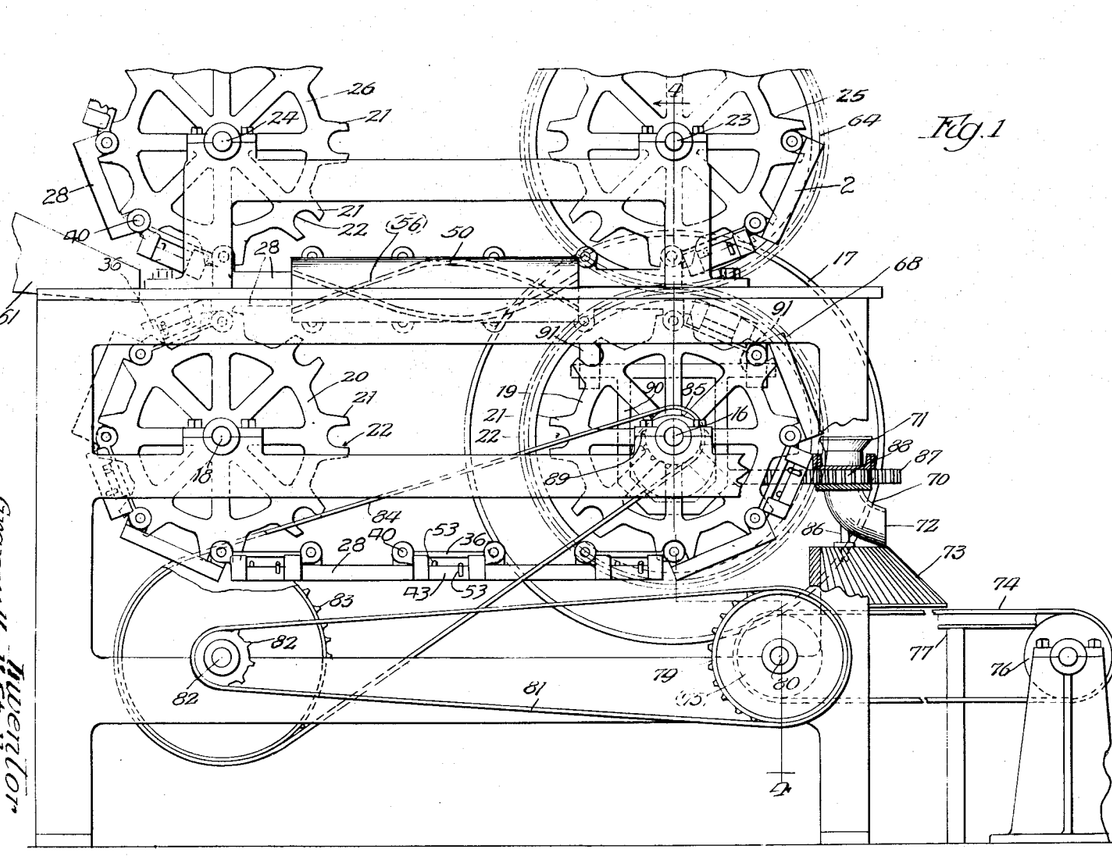
Figure 1 is a view in side elevation partly in section, partly broken away and with parts omitted, of an improved machine of this character constructed in accordance with the principles of this invention.
Figure 2:
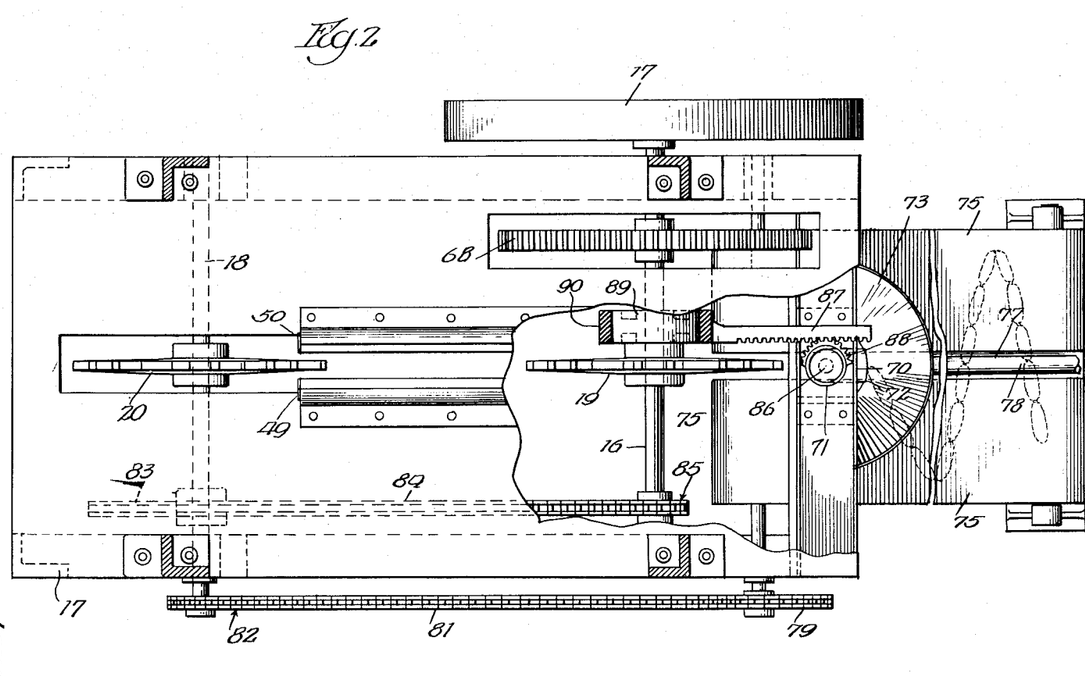
Figure 2 is a top plan view of the machine partly broken away and with parts omitted.

As the links are shaped and twisted and as the co-operating shaping and twisting members pass from between the guides 49—50 (reference being now had more particularly to Figures 1 and 2), the respective co-operating elements of the shaping and twisting members will be separated and the link will be delivered from between the separated elements by the advancement of the elements. The chain of links as they are thus delivered will be received by a spout or chute 70 having a flared or funnel shaped opening 71 at the top thereof into which the links are delivered and a discharge outlet 72 (see also Figure 3). Obviously this chute or spout may be arranged in any convenient position.

Disposed beneath the outlet 72 of the spout is a guide member 73 preferably of a frusto conical shape adapted to receive the links just as they pass out of the spout. Disposed beneath the guide member 73 is a conveyor for receiving the links and this conveyor preferably embodies spaced endless members 74 which pass over pulleys 75—76, mounted in suitable bearings. Interposed between the members of the endless conveyor 74 is a trough or channel 77 which is of a sufficient depth to receive a stick or bar 78 and hold the latter so that its upper surface will be preferably disposed beneath the upper surface of the uppermost run of the endless conveyor 74, motion being imparted to the endless conveyor in any suitable manner preferably by means of a sprocket wheel 79 secured to a shaft 80 and to which shaft 80 the pulleys 75 are connected. A sprocket chain 81 passes over the sprocket wheel 79 and also over another sprocket wheel 80, the latter being connected with a shaft 82, which in turn has connected with it a sprocket 83, over which a sprocket chain 84 passes and which sprocket chain also passes over another sprocket wheel 85 carried by the shaft 16. Thus it will be seen that by an operation of the shaft 16 the endless conveyor 74 will be operated.

In order to distribute the chain of links as they are delivered from the spout 72, across the endless conveyor 74 and also across the stick 78 so that when the stick is raised the links will be raised and will hang over the sticks so that the links may be transported and further treated if desired, it is necessary to distribute the links as they pass out of the spout 70. This is preferably accomplished by rotating the spout 70 on a vertical axis. To that end there may be provided a stud or projection 86 connected to the spout and which is journaled in a suitable bearing so that the end 72 of the spout 70 will terminate adjacent the upper edge of the distributing conical shaped member 73. The spout is adapted to oscillate back and forth upon the pivot thus formed and any suitable means may be provided for imparting such oscillation thereto, such as a rack 87 which engages a pinion 88 connected with the spout 70. The rack moves in a suitable guide and is given its motion preferably by means of an eccentric 89, the rack being connected to a yoke 90 within which the eccentric 89 operates, the eccentric being preferably connected with the shaft 16 for rotation therewith.

The yoke 90 moves in suitable guides 91, so that when the shaft 16 is rotated the eccentric 89 will be rotated and this will impart a reciprocating movement to the rack 87 to oscillate the spout 70 about the pivot 86. Inasmuch as the links are being fed from the spout during this oscillation it will be manifest that by reason of the inclined or conical shaped distributing member 73, the links will be delivered upon the latter and as they move downwardly off of the member 73 they will be deposited upon the endless conveyor 74 and across the stick 78. When desired the chain of links may be severed from the next advancing links so as to permit the stick 78 to be raised out of the trough shaped portion 77 and as the stick is beneath the links it will be manifest that the links will be contacted by the stick and raised from the conveyors so that the links will hang across the stick.

With this improved construction it will be manifest that the operation is a continuous operation and that the casing is not only shaped but is twisted into links of the desired length and the links are delivered across a stick so that it is not necessary to arrange the links upon the stick by hand.

While the preferred form of the invention has been herein shown and described it is to be understood that various changes may be made in the details of construction and in the combination and arrangement of the several parts, within the scope of the claims, without departing from the spirit of this invention.

What is claimed as new is:—

1. A sausage linking machine embodying a plurality of separate and continuously operating holders and twisters pivotally connected together, and means for actuating the twisters, the said twisters embodying a plurality of separate and normally disconnected sections, each section embodying a plurality of elements some of which elements are rotatable with respect to the others.

2. A sausage linking machine including link forming and twisting mechanism, and means for laying the chain of links in a substantially horizontal plane across a supporting stick and for maintaining the links in a horizontal plane which is substantially co-extensive with the length of the portion of the stick which engages the links, whereby when the stick is elevated the chain of links will hang across the stick.

3. A sausage linking machine including link forming and twisting mechanism, and means for laying the chain of links in a substantially horizontal plane across a supporting stick throughout substantially its length and maintaining the links in a horizontal plane which is substantially co-extensive with the length of the portion of the stick engaged by the links, whereby when the stick is lifted the chain of links will hang across the stick.

4. A sausage linking machine including a series of link holders and link twisters alternately connected together, the said holders operating to hold certain links against twisting while the twisters operate to twist others of the links with respect thereto, a substantially flat support for receiving and maintaining the links in a horizontal plane during the entire time that the links are in engagement with the said support, and means for delivering the chain of links flat upon the support.

5. A sausage linking machine including a series of link holders and link twisters alternately connected together, the said holders operating to hold certain links against twisting while the twisters operate to twist others of the links with respect thereto, a flat horizontal support, and means for delivering the chain of links from the machine flat upon the support and across a supporting stick below the support, the surface of the flat support which engages the link being substantially co-extensive with the length of the stick.

6. A sausage linking machine including a series of link holders and link twisters alternately connected together, the said holders operating to hold certain links against twisting while the twisters operate to twist others of the links with respect thereto, a link support disposed in a horizontal plane on each side of the supporting stick, and means for laying the chain of links flat upon the support and back and forth across the stick, the flat supporting surface of the support and the portion of the stick upon which the links engage being substantially co-extensive in length.

7. A sausage linking machine including a series of link holders and link twisters alternately connected together, the said holders operating to hold certain links against twisting while the twisters operate to twist others of the links with respect thereto, a supporting surface disposed in a horizontal plane on each side of a supporting stick, means for laying across the stick and flat upon the support the chain of links as they are formed, and means for advancing the links in a direction lengthwise of the stick and while they rest flat upon the said surface, the flat supporting surface of the support and the surface of the stick upon which the links hang being substantially co-extensive in length.

8. A sausage linking machine including a series of link holders and link twisters alternately connected together, the said holders operating to hold certain links against twisting while the twisters operate to twist others of the links with respect thereto, a support for receiving the chain of links, means for laying the chain of links back and forth upon the support and upon a supporting stick adapted to be positioned below the surface of the support whereby the stick may be raised to engage and remove the links so that they will hang across the stick.

9. A sausage linking machine including a series of link holders and link twisters alternately connected together, the said holders operating to hold certain links against twisting while the twisters operate to twist others of the links with respect thereto, a support for receiving the chain of links, means for laying the chain of links back and forth upon the support, means for advancing the links upon the support, and upon a supporting stick adapted to be positioned below the surface of the support whereby the stick may be raised to engage and remove the links so that they will when lifted by the stick hang thereacross.

10. A sausage linking machine including a series of link holders and link twisters alternately connected together, the said holders operating to hold certain links against twisting while the twisters operate to twist others of the links with respect thereto, a support for receiving the chain of links, means for laying the chain of links back and forth upon the support, means for advancing the links upon the support, and a common source of power for actuating the parts, the said links being laid across a supporting stick while they are being delivered to the said support, the surface of the support being horizontal for a distance substantially co-extensive with the length of the stick whereby when the stick is raised to engage and lift the links they will hang across the stick.

11. A sausage linking machine including means for shaping the links, means for twisting the links, and means for laying the chain of links in a substantially horizontal plane across and for a distance substantially co-extensive with the length of a stationary supporting stick.

12. A sausage linking machine including means for shaping the links, means for twisting the links, means for laying the chain of links in a substantially horizontal plane across a supporting stick, said horizontal plane being substantially co-extensive with the length of the stick, and means for advancing the links in a direction lengthwise of the stick and as the links are laid thereacross and maintained in a horizontal plane.

13. A sausage linking machine including means for forming the links, means for twisting the links, and means for laying the chain of links in a substantially horizontal plane across a supporting stick, said horizontal plane being substantially co-extensive with the length of the stick, the last recited means including a movable distributor and means for imparting a forward and backward movement to the distributor.

14. A sausage linking machine including means for forming the links, means for twisting the links, and means for laying the chain of links in a substantially horizontal plane across a supporting stick, said horizontal plane being substantially co-extensive with the length of the stick, the last recited means including a pivotally mounted distributor and means for oscillating the distributor about its pivot.

15. A sausage linking machine including means for forming the links, means for twisting the links, and means for laying the chain of links in a substantially horizontal plane across a supporting stock, said horizontal plane being substantially co-extensive with the length of the stick, the last recited means including a pivotally mounted distributor and means embodying a rack and pinion for oscillating the distributor about its pivot.

16. A sausage linking machine including means for forming the links, means for twisting the links, means for laying the chain of links across a supporting stick in a horizontal plane substantially co-extensive with the length of the stick, the last recited means including a pivotally mounted distributor, means for oscillating the distributor about its pivot, and an inclined guide between the distributor and the stick for receiving the links from the distributor and delivering them to the stick.

17. A sausage linking machine including means for forming the links, means for twisting the links, means embodying a movable distributor for laying the chain of links across a supporting stick in a horizontal plane substantially co-extensive with the length of the stick, means for imparting a forward and backward movement to the distributor, and an inclined guide disposed between the said distributor and the stick for delivering the links to the latter.

18. A continuously operating sausage linking machine including mechanism for shaping the links, mechanism for twisting the links to form a chain of connected links, and mechanism for laying the chain of links in a horizontal plane across a supporting stick to be supported independently of the stick and in a manner that when the stick is lifted it will lift the chain of links and cause the links to hang upon the stick, the said horizontal plane being substantially co-extensive with the length of the stick.

19. A continuously operating sausage linking machine including means for shaping the links, means for twisting the links to form a chain of connected links, means for laying the chain of links in a horizontal plane across a supporting stick, said horizontal plane being substantially co-extensive with the length of the stick, and means for advancing the links while in a horizontal plane and the stick one with relation to the other and in a direction lengthwise of the stick to prevent the links from being superposed upon each other and so that when the stick is raised to engage the links they will hang upon the stick.

20. A sausage linking machine including a series of link formers formed of separable sections, a series of link twisters formed of separable sections, the respective sections of each being flexibly connected together to form endless traveling members, the adjacent runs of the endless members being so disposed with respect to each other that the co-operating sections of the formers and twisters will be brought into proximity and co-operative active relation at predetermined points in their travel, means for imparting motion to the endless members, and means for actuating the twisters.

21. A sausage linking machine including a series of sectional link formers, a series of sectional link twisters, the respective sections of each being flexibly connected together to form endless traveling members, the adjacent runs of the endless members being so disposed with respect to each other that the co-operating sections of the formers and twisters will be brought into proximity and co-operative active relation at predetermined points in their travel, means for imparting motion to the endless members, means for actuating the twisters, the said twisters embodying a plurality of elements certain of which elements are rotatable relatively to others of the elements, means for maintaining certain of the elements against rotation, and means for rotating certain of the elements with relation to the non-rotative elements.

22. A sausage linking machine including a series of sectional link formers, a series of sectional link twisters, the respective sections of each being flexibly connected together to form endless traveling members, the adjacent runs of the endless members being so disposed with respect to each other that the co-operating sections of the formers and twisters will be brought into proximity and co-operative active relation at predetermined points in their travel, means for imparting motion to the endless members, means for actuating the twisters, the said twisters embodying a plurality of elements certain of which elements are rotatable with relation to others of the elements, means for maintaining certain of the elements against rotation, means for rotating certain of the elements with respect to the non-rotative elements, and means permitting movement of the rotative elements and the non-rotative elements one with relation to the other and in directions lengthwise of the longitudinal axis of the rotative elements.

23. A sausage linking machine including a twister, said twister embodying separable sections, said sections embodying a plurality of elements rotatable one with relation to the other, means for bringing the said sections together to cause the rotatable elements to encompass the link, means for holding the sections in co-operative relation, and means for rotating the rotatable elements with relation to the other respective elements, the second recited means operating to maintain the last recited elements against rotation.

24. A sausage linking machine including a series of sectional link formers, a series of sectional link twisters, the respective sections of each being flexibly connected together to form endless twisting members, the adjacent runs of the endless members being so disposed with respect to each other that the co-operating sections of the formers and twisters will be brought into proximity and co-operative relation at a predetermined point in their travel, and means for imparting motion to the endless members, the said formers embodying co-operating jaw like members for engaging the casing to separate the material therein.

25. A sausage linking machine including a series of sectional link formers, a series of sectional link twisters, the respective sections of each being flexibly connected together to form endless twisting members, the adjacent runs of the endless members being so disposed with respect to each other that the co-operating sections of the formers and twisters will be brought into proximity and co-operative relation at a predetermined point in their travel, and means for imparting motion to the endless members, the said formers embodying co-operating bifurcated members extending across the sections of the former and in directions transverse to the longitudinal axis of the sections.

26. A sausage linking machine including a series of sectional link formers, a series of sectional link twisters, the respective sections of each being flexibly connected together to form endless traveling members, the adjacent runs of the endless members being so disposed with respect to each other that the co-operating sections of the formers and twisters will be brought into proximity and co-operative relation at a predetermined point in their travel, and means for imparting motion to the endless members, the said formers embodying co-operating jaw like members for engaging the casing to separate the material therein, one of said jaw like members being resilient.

27. A sausage linking machine including a series of sectional link formers, a series of sectional link twisters, the respective sections of each being flexibly connected together to form endless traveling members, the adjacent runs of the endless members being so disposed with respect to each other that the co-operating sections of the formers and twisters will be brought into proximity and co-operative relation at a predetermined point in their travel, and means for imparting motion to the endless members, the said formers embodying co-operating bifurcated members extending across the sections of the former and in directions transverse to the longitudinal axis of the section, one of the said bifurcated members being resilient.

28. A sausage linking machine including a series of sectional link formers, a series of sectional link twisters, the respective sections being flexibly connected to form endless traveling members, the adjacent runs of the endless members being so disposed with respect to each other that the co-operating sections of the formers and twisters will be brought into proximity and co-operative relation at predetermined points in their travel, a guideway through which one of the runs of the members passes to bring the sections together, the said twister sections each including a plurality of elements, one of which is rotatably mounted upon the other, said guideway operating to hold one of the elements of the twister section against rotation, and means for rotating the rotatable element of the twister section.

29. A sausage linking machine including a series of sectional link formers, a series of sectional link twisters, the respective sections being flexibly connected to form endless traveling members, the adjacent runs of the endless members being so disposed with respect to each other that the co-operating sections of the formers and twisters will be brought into proximity and co-operative relation at predetermined points in their travel, a guideway through which one of the runs of the members passes to bring the sections together, the said twister sections each including a plurality of elements one of which is rotatably mounted upon the other, said rotatable elements being also adapted for free shifting movement with relation to the other elements and in directions lengthwise of the axes of the rotatable elements.

30. A sausage linking machine including a series of sectional link formers, a series of sectional link twisters, the respective sections being flexibly connected to form endless traveling members, the adjacent runs of the endless members being so disposed with respect to each other that the co-operating sections of the formers and twisters will be brought into proximity and co-operative relation at predetermined points in their travel, a guideway through which one of the runs of the members passes to bring the sections together, the said twister sections each including a plurality of elements one of which is rotatably mounted upon the other, the pivots between adjacent formers and twisters co-operating with the guideway to hold certain of the twister elements against rotation, and means for rotating the rotatable elements of the twisters.

In testimony whereof I have signed my name to this specification on this 26th day of November, A. D. 1923.

GRANVILLE H. STALLMAN.